United States Patent [19]

Boucher

[11] Patent Number: 4,898,029

[45] Date of Patent: Feb. 6, 1990

[54] MARINE INSTRUMENT

[75] Inventor: Stephen G. Boucher, Amherst, N.H.

[73] Assignee: Airmar Technology Corporation, Milford, N.H.

[21] Appl. No.: 310,859

[22] Filed: Feb. 14, 1989

Related U.S. Application Data

[63] Continuation of Ser. No. 178,898, Mar. 31, 1988, Pat. No. 4,836,020, which is a continuation of Ser. No. 7,527, Jan. 28, 1987, abandoned.

[51] Int. Cl.$^4$ ............................................. G01C 21/10
[52] U.S. Cl. ..................................................... 73/187
[58] Field of Search .......................... 73/187, 185, 181

[56] References Cited

U.S. PATENT DOCUMENTS

| 3,706,224 | 11/1972 | Overs | 73/187 |
| 4,206,637 | 6/1980 | Pankonien | 73/187 |
| 4,555,938 | 12/1985 | Boucher et al. | 73/187 |
| 4,836,020 | 6/1989 | Boucher | 73/187 |

Primary Examiner—Donald O. Woodiel
Attorney, Agent, or Firm—Hamilton, Brook, Smith & Reynolds

[57] ABSTRACT

A through-hull speed sensor of the magnetized paddlewheel sensor type wherein a paddlewheel is rotatably supported in a cavity adjacent a magnetic sensing device which generates electrical pulses corresponding to paddlewheel speed as the wheel rotates when the vessel moves through the water. The sensor has improved low speed characteristics provided by a housing which extends the paddle wheel into the water below the hull. The bow of the housing provides a new leading edge, generating a smaller thickness boundary layer at the paddlewheel, so that the paddles project beyond the layer at low speeds. High speed performance is improved by having a high ratio of paddle fore-to-aft drag coefficient shape; keeping the periphery of the paddlewheel hub within, or flush with, the bottom of the cavity; a low paddle projection versus paddlewheel radius ratio; and by keeping the ratio of paddle cross-section versus available cavity cross-sectional space within an optimum range.

18 Claims, 5 Drawing Sheets

MARINE INSTRUMENT

This application is a continuation of application Ser. No. 07/178,898, filed Mar. 31, 1988, now U.S. Pat. No. 4,836,020, which was a File Wrapper Continuation of application Ser. No. 07/007,527, filed Jan. 28, 1987, now abandoned.

TECHNICAL FIELD

This invention is in the field of marine instrumentation for providing information with respect to the speed of marine vehicles through water.

BACKGROUND

U.S. Pat. No. 4,555,938 describes a transom mounted marine speed sensor of the paddlewheel type, in which the paddles or blades are asymmetric in shape and formed of magnetized amorphous magnetic material. As the marine vessel passes through water, the paddlewheel rotates about an axis which is transverse the direction of travel. A Hall-effect device adjacent the paddlewheel senses the change in the magnetic field emanating from the paddles and generates an electrical signal directly proportional to the rotational speed of the paddlewheel. Generally, the rotational speed of the paddlewheel is linearly related to the vessel speed, but this is not always the case; especially at the extremes of high and low speeds.

The unenclosed design of the transom mounted paddlewheel sensor of the '938 patent has been found to improve linearity, at high speeds over that obtainable in enclosed transom mounted paddlewheel sensors and the alternate enclosed "through-hull" type paddlewheel speed sensors, i.e., sensors mounted through a hole formed in the vessel hull.

Various techniques have been devised, in an attempt to improve the high-speed performance of such enclosed paddlewheel speed sensors. Casani et al. in U.S. Pat. No. 3,531,988, suggest an open paddlewheel construction, in which four paddles are each supported by arms which define an open space between the paddle and the wheel shaft. Maeder et al. in U.S. Pat. No. 3,457,782, employs a waterwheel having a plurality of buckets, closed at their side, and recessed in the peripheral edge of the wheel. The slot within which the wheel rotates, is open on the downstream side. According to Maeder et al., this provides a relief space which prevents a buildup of pressure on that side, which would vary the rotational characteristics of the wheel.

Despite the above efforts, and that of other workers in the art, a need exists for a through-hull speed sensor with improved performance, especially at high speeds, which does not at the same time sacrifice low speed linearity and accuracy.

DISCLOSURE OF THE INVENTION

Through a series of experiments, it has been determined that a number of interrelated factors affect the high and low speed performance of enclosed cavity paddlewheel speed sensors. Chief among them are the following:

I. Boundary Layer

I have found that the low speed characteristics of through-hull paddlewheel sensors improves when the sensors are mounted in a housing which projects into the water a certain distance. While the exact nature of this phenomena as it relates to complex shapes is not fully understood, it is believed that this improvement results from extension of the paddles through the boundary layer.

A boundary layer of water is formed on the hull of boats as the boat traverses the water. The thickness of this layer varies principally with the speed of the boat and the distance of the layer from the leading edge of the water as it meets the bow or forward edge of the boat. The fluid, i.e., water, within the boundary layer, attaches to the vessel hull and flows at a lesser rate relative to the boat as compared with the water outside the layer. This rate varies throughout the thickness of the layer.

For a given fixed paddlewheel sensor location, the boundary layer thickness $\delta$ at the sensor is directly proportional to the distance "X" between the sensor and the leading edge. If the sensor paddles do not project beyond the thickness $\delta$, true speed is not sensed.

For nearly all vessel speeds and operational conditions and practical paddlewheel mounting locations, the flow regime is turbulent. Therefore, the boundary layer thickness $\delta$ must be calculated using equations for turbulent flow conditions. Assuming a speed of 5 mph and a sensor located a distance $X = 10$ feet from the leading edge, at that speed; the boundary layer thickness $\delta$ is calculated, for turbulent conditions, to be about 2 inches. In contrast, at 55 mph, the boat rises, or planes, reducing the wetted surface and the leading edge moves back toward the sensor. Assuming the distance X is now about 2 feet; $\delta$ becomes about $\frac{3}{8}$ inches. It may thus be seen that a paddlewheel projecting a half-inch into the water would not produce correct readings of true water speed at low speeds, since it would not extend beyond the boundary layer. Furthermore, its accuracy would vary with speed, since at higher speeds, it projects a further distance into the boundary layer than at low speeds. While, theoretically, this problem could be solved by increasing paddlewheel diameter, such an increase in diameter would require a much larger hole in the hull. Large diameter holes in hulls are to be avoided, for obvious reasons.

In accordance with the invention, a new leading edge is obtained a known short distance away from the speed sensor. This new leading edge may be conveniently obtained by providing a housing which projects below the hull. The projecting portion of the housing has a pointed bow portion extending upstream which forms the new leading edge. A pointed aft portion extends downstream. The projecting section of the housing is horizontally aligned with the water surface by fairing blocks and projects a distance about equal to or greater than the largest anticipated thickness $\delta$ of the new boundary layer formed by the new leading edge obtained at the bow of the projecting section at reasonable anticipated vessel speeds, i.e., about 3 miles per hour, or higher. An intermediate portion of the projecting section houses the paddlewheel a predetermined, relatively short distance X' from the tip of the bow within a cavity formed therein.

In a preferred embodiment, the bow portion houses a sonar transducer element for sensing depth of water; while the aft portion houses a Hall-effect device for sensing the rotating magnetic field created as the paddlewheel revolves. Optionally, a thermal sensor, in the form of a thermistor, may be located in the aft or bow portion, to sense water temperature.

With a paddlewheel rotating on an axis located about 3.75 inches from the point of the bow portion of the housing, δ is calculated to be about 0.1 inches at 5 miles per hour and becomes progressively thinner as speed is increased. Thus, the paddle can be made with a minimum amount of projection, as compared to a system without a projecting housing, the bow of which forms a new leading edge. Such a projecting sensor will produce substantially accurate water speed signals at low speeds while minimizing inaccuracy caused by changing boundary layer thickness at different speeds.

II. Paddle Shape, Hub Placement, Paddle Projection, Cross-Section

The performance of the enclosed cavity through-hull paddlewheel sensors, especially at high speeds, i.e., above about 35 mph, has been found, in accordance with the invention, to be related in a complex manner to four main factors:

(i) the forward versus rearward shape of the paddle;
(ii) the vertical placement of the hub, from which the paddles extend;
(iii) the relative projection of the paddles versus the diameter of the paddlewheel; and
(iv) the ratio of paddle cross-section to available cavity cross-sectional space.

These factors are discussed below as follows:

(i) Paddle Shape: The forward shape should have a relatively large coefficient of drag, as compared to the rearward shape, so as to minimize the force required to rotate the impeller within the cavity. As speed increases, i.e., at about 25–35 miles per hour, this force becomes greater due to turbulence in the enclosed cavity. An acceptable fore-to-aft drag coefficient ratio is achieved in a preferred embodiment by forming the paddles in the shape of a half-hemisphere with the front of the paddle, presenting a blunt, or bluff, frontal surface and the shape at the rear of each paddle is formed as a curved half-hemispherical surface. This produces a frontal drag coefficient of about 1.17 and a rearward drag coeffecent of about 0.42 (See "Elements of Fluid Mechanics", D. G. Shepard © 1965, page 356) or a front-to-back (fore-to-aft drag coefficient ratio) ratio of about 2.8. A ratio of 2.5 or more, is preferred.

(ii) Hub Placement: The paddlewheel should be vertically located within the cavity so that the periphery of the hub does not extend beyond the cavity. Pressure measurements, taken at several locations at the top of the paddlewheel cavity at various boat speeds, have shown that, as the hub is extended beyond the bottom of the cavity, negative pressure builds up within the cavity as speed is increased. The reason for this phenomena may be caused, in part, by the extended hub which deflects the water flow, creating an airfoil effect. I have found that by keeping the hub periphery level, or within the bottom of the cavity, reduces this tendency and increases the speed threshold before onset of cavitation.

(iii) Projection: In addition to the hub location, it is important that the Projection Ratio, i.e., the ratio of paddle length (paddle projection), versus the overall radius of the paddlewheel, be kept relatively low. This minimizes negative pressure build-up within the cavity at increased speeds. Increasing negative pressure leads, eventually, to cavitation within the cavity, with resulting unpredictable behavior of the rotating paddlewheel. In accordance with the invention, a ratio of about 0.6, or less, has been found to be satisfactory for high speed operation.

(iv) Cross-Section: To further minimize build-up of negative cavity pressure and thus minimize the tendency for cavitation at higher speeds, the Cross-Section Ratio, i.e., the ratio of the cross-sectional shape of the paddles, taken in a plane transverse the direction of flow, versus the available cross-sectional space in the cavity, in the same plane, should be optimized within a range about 0.25 to 0.5. In accordance with the present invention, this Cross-Section Ratio is in the order of 0.40. This ratio is achieved by symmetrically contouring, or rounding-off, the side walls of the paddles, at the tips and symmetrically removing material from the sidewalls as they join the hub. This reduces the numerator of the ratio, i.e., paddle cross-section.

The factors involved in optimizing the Cross-Section Ratio are paddle shape and material and slow speed slippage. The paddle shape is constrained by the requirement for a high fore-to-aft drag ratio, the need to maximize paddle section near the outside diameter so as to generate maximum rotational force (torque), and the need to have sufficient mass of amorphous magnetic material close to the cavity walls so as to generate sufficient magnetic field strength to switch commonly available Hall-cell devices.

Reducing the cross-section ratio allows the entrained water in the cavity to be laterally displaced at higher paddlewheel rotational speeds and allows some venting of the negative pressure buildup in the cavity.

When the cross-sectional ratio drops below 0.25, linearity at slow speed is compromised, since bearing friction and viscous drag forces approach the magnitude of applied rotational force and thereby causes increased paddlewheel slippage as the vessel travels through the water.

The lower limit to cross-sectional ratio is dependent on the required linearity and accuracy of the paddlewheel at low boat speeds (5 miles per hour). As the frontal cross-sectional area of the paddle is reduced, the force applied to rotate the paddlewheel is proportionally reduced. While the profile drag may be somewhat reduced, due to the narrower section, the viscous drag (i.e., frictional drag) and bearing friction are not proportionally reduced. (The viscous drag remains nearly constant because the wetted surface of the paddlewheel is not reduced linearly with reduction in paddlewheel cross-section.)

Most conventional prior art paddlewheels maintain a close tolerance between the cavity wall and the paddles and are analogous to positive displacement pumps whereby fluid is entrained between the paddles as they rotate into the cavity and exhausted as the paddles exit. This near positive displacement design of most paddlewheels is a prime cause of negative pressure and eventual paddlewheel cavitation at higher vessel speeds.

The above, and other features and advantages, will now be described, in detail, in connection with the drawings.

BEST MODE OF CARRYING OUT THE INVENTION

Figure 1:
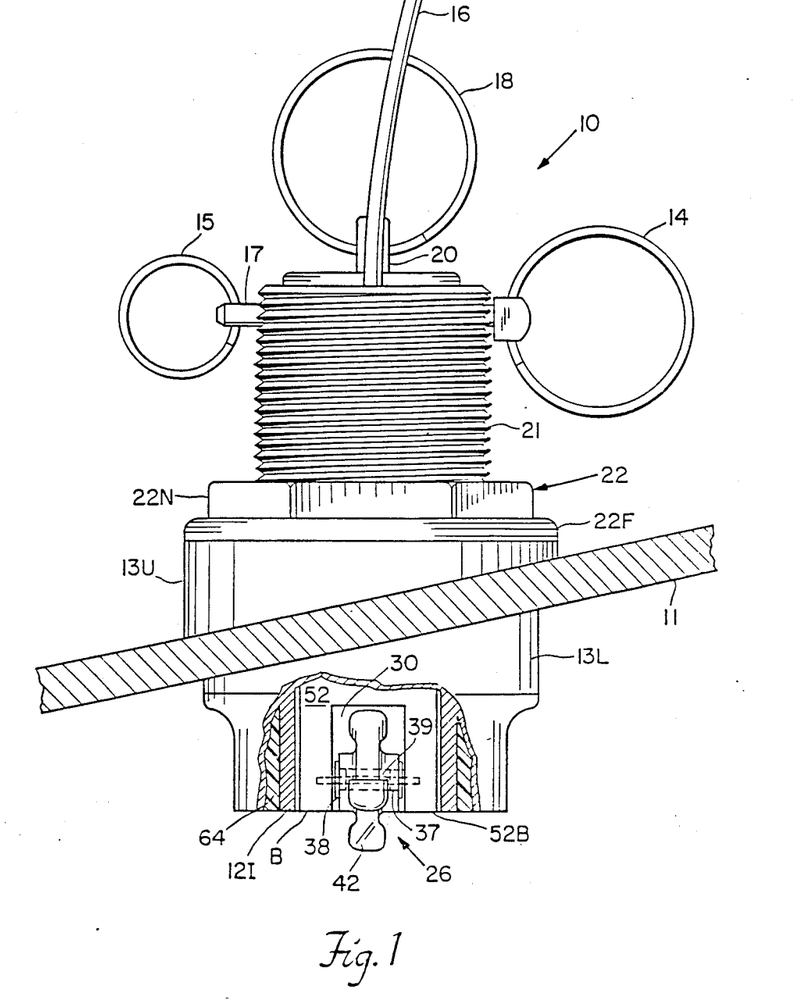
FIG. 1 is an elevational frontal view of a high speed through-hull speed sensor in accordance with the invention in partial cut-away form including the hull 11 and shim and fairing 13U and 13L, respectively.
Figure 2:
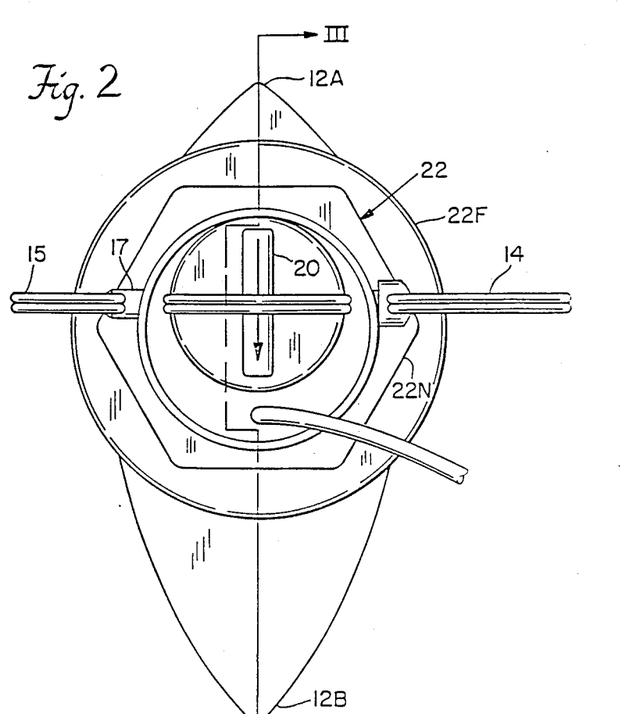
FIG. 2 is a top view of the sensor of FIG. 1.
Figure 3:
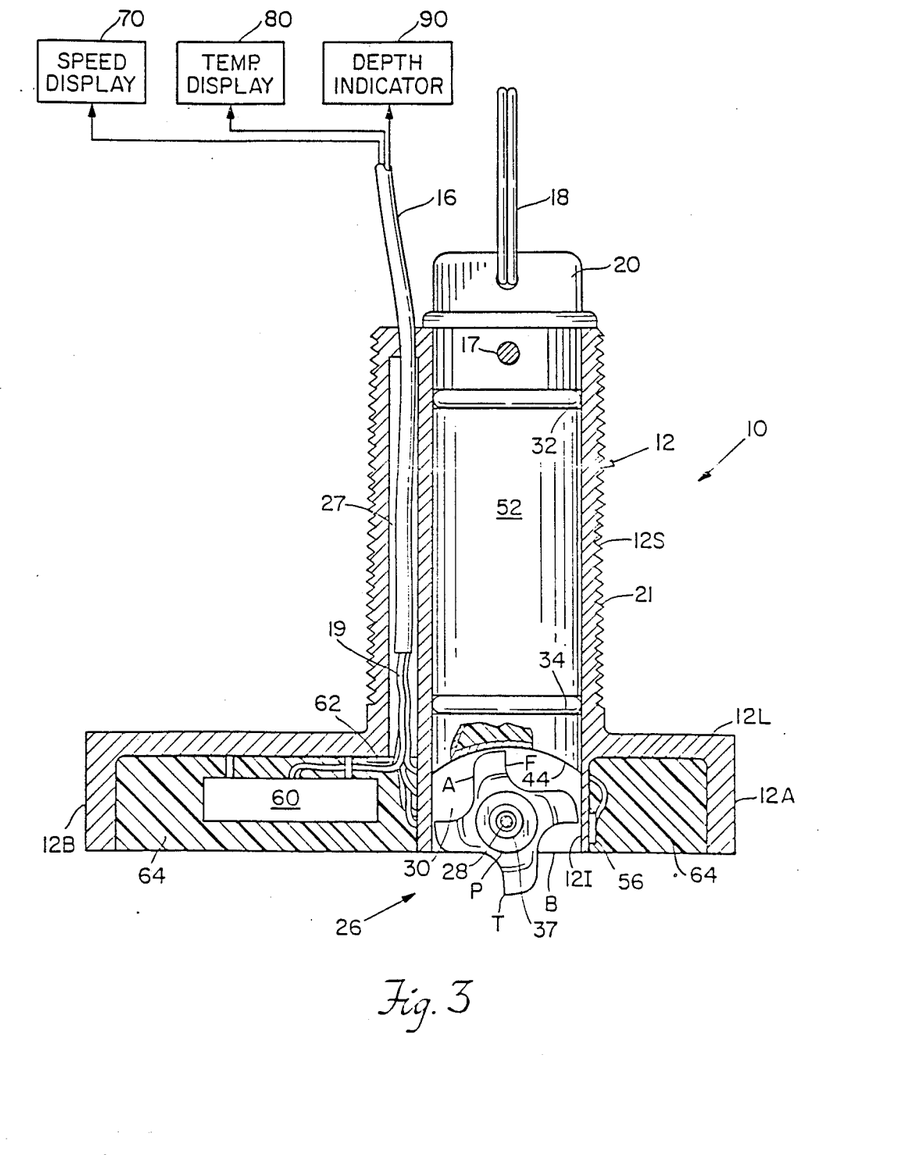
FIG. 3 is a cross-sectional view along the lines III—III of FIG. 1, which, for simplicity, omits the flanged nut 22 and the detail cross-section of transducer 60 and Hall-effect device 56.

The invention will now be described in detail in connection with the drawings. Referring now to FIGS. 1-3, there is shown a preferred embodiment of the invention comprising a high speed through-hull tri-sensor device 10 for marine vessels. The device 10 may be mounted through the hull 11 of a boat (not shown). The sensor has a housing designated, generally, by the numeral 12, comprising a vertically extending housing sleeve 12S, and lower body portion 12L, respectively.

The sleeve 12S is positioned in an opening through the hull 11. Upper wedge or shim and lower fairing block 13U and 13L, respectively, are wedged between the top surface of lower body portion 12L, hull 11 and lock-nut 22, to position sensor 10 in a vertical plane. Nut 22 preferably has a bottom skirt, or flange portion 22F, which rests against the upper shim 13U and a hexagonal nut portion 22 with internal threads, which engage a set of external threads 21 on the exterior periphery of the sleeve 12S.

A tubular body 52, the lower portion of which forms the paddlewheel cavity 30, is adapted to slideably insert into the sleeve 12S. Seal rings 32 and 34, respectively, are disposed in grooves on the periphery of the body 52 and form a fluid-tight seal between the body and sleeve. Body 52 is of tubular shape and is formed of metal or plastic.

A cable 16 containing wires 19 is coupled through a bored hole 27 formed in an enlarged wall of the sleeve 12S. Wires 19 provide electrical connection to components, such as Hall-effect device 56, sonar transducer 60, and thermistor 62, affixed to the inner walls of lower body portion 12L. The upper end of body 52 includes a tab 20, through which a pull ring 18 is attached.

A second pull ring 14 is affixed to pin 17 which extends through a bore in sleeve 12S and a transverse bore in body 52. The relative location of the bores assures that when pin 17 is in place, the body 52 is vertically aligned so that the bottom wall 52B is coplanar, or flush, with the bottom of the housing. Removable lock ring 15 is used to secure the pin 17 in place.

A paddlewheel 26 is rotatably mounted on axle 28 within the cavity 30 formed in the lower portion of body 52. Paddlewheel 26 is an integral structure having a hub 38 from which four asymmetric shaped paddles extend about the periphery thereof. The axle 28 rotates within bearings 37 disposed in a bore 39 which extends through a central opening in the hub 38, and into opposing recessed holes in the cavity side walls formed in body 52. The paddlewheel 26 is thereby rotatably suspended within the cavity 30. Preferably, paddlewheel 26 is formed of amorphous magnetized material, such as barium ferrite. The paddles 42 may be polarized with respect to the hub, or with respect to each other. As the paddles rotate about the shaft when the vessel traverses the water, the variation in magnetic field is sensed by a Hall-effect device 56 mounted on an interior wall 12I of housing 12.

The lower portion 12L of the housing extends about 1 inch, or more, (due to the fairing block), into the water in operation, and thus may be more readily subjected to impact from objects than prior art flush mounted, or low profile flanged, through-hull sensors. If the housing breaks, water may enter the boat through the opening. Therefore, the housing should preferably be made of thick cast, non-corrosive metal.

Also, a preferred location for the Hall-effect device 56 is on a housing wall closely adjacent the cavity 30, such as wall 12I, where it can be encapsulated and protected from the water. Therefore, housing 12 should be constructed of non-ferrous metal, so that it will be permeable to the magnet field emanating from the paddlewheel. Bronze is therefore a preferred material, since it meets all of the above criteria.

Sonic transducer assembly 60, thermal sensing device 62, and Hall-effect device 56, are substantially as described in U. S. Pat. No. 4,555,938, and are electrically coupled via wires 19 to depth indicator 90, temperature display 80, and speed display 70, respectively; also as described therein. The interior of the lower housing, at the bow end 12B, contains sensors 60 and 62 and is encapsulated in potting material 64, such as polyurethane. Likewise, the interior at the aft end 12A, containing Hall-effect device 66, is encapsulated with polyurethane 64.

Figure 4:
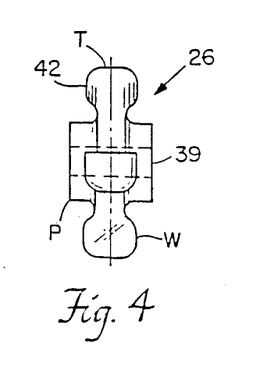
FIG. 4 is an elevational plan view of paddlewheel 26 of the invention.
Figure 5:
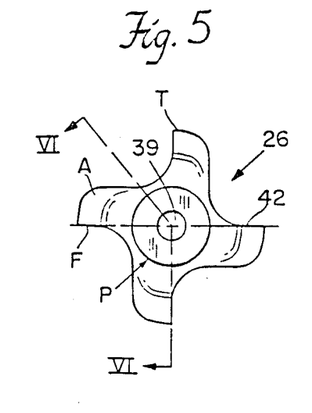
FIG. 5 is a side view of FIG. 4.
Figure 6:
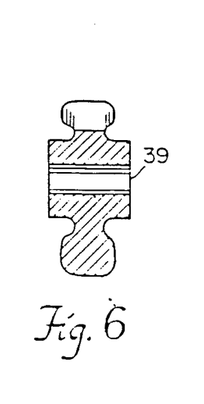
FIG. 6 is a cross-sectional view taken along lines VI—VI of FIG. 5.

The upper wall 44 of cavity 30 is an arched surface, closely spaced from the tip T of the four paddles 42 as they rotate about axle 28. The periphery P of the hub 38 is approximately flush with the bottom surface B of the cavity. The profile of the paddles is contoured as a bluff frontal surface F and a convex curve aft surface A to produce a high drag coefficent ratio (aft versus fore) of about 2.8. A high fore-to-aft ratio is produced when the aft drag coefficient is low and the fore drag coefficient is high. In the embodiment shown, the fore shape is a flat, or near planar, surface and the high fore drag coefficent of the paddle is calculated as about 1.17. The aft shape is a convex half-hemisphere producing a calculated low aft drag coefficient of about 0.42. This should be compared with the fore-to-aft ratio for the asymmetric paddles of U.S. Pat. No. 4,555,938, which is calculated to be about 1.5.

The radius of the paddlewheel 26, measured from tip to center, is about 0.61 inches and the four paddles 42 project a distance of about 0.33 inches from the cavity bottom B to produce a relatively low paddle projection to paddlewheel radius ratio (Projection Ratio) of about 0.55. Known prior art paddlewheel sensors, such as that shown in U.S. Pat. No. 4,555,938, have had Projection Ratios as high as 0.8. In accordance with the invention, a ratio of 0.6, or less, is required for high speed performance.

To further minimize build-up of negative cavity pressure and thus minimize the tendency to cavitate within the cavity at higher speeds, the cross-sectional shape of the paddles 42, taken in a plane transverse the direction of flow versus the available cross-sectioned space in the cavity in the same plane, i.e., Cross-Sectional Ratio, should be kept to a ratio of between 0.25 to 0.5. In accordance with the present invention, this ratio is in the order of 0.40. This ratio is achieved by using a relatively thin cross-sectional paddle and by symmetrically rounding off the side walls W (See FIG. 4) of the paddles at the tips and symmetrically removing material from the sidewalls as they join the hub. This reduces the numerator of the ratio, i.e., paddle cross-section.

The paddlewheel diameter is about 1.22 inches and the hub diameter is about 0.50 inches, resulting in a paddle length of about 0.36 inches. The paddle width is about 0.335 inches and the minimum gap between the paddle tips T and the top of the cavity is about 0.030 inches. The cross-sectional ratio is computed as follows:

Available Cavity Cross-Section=Cavity Width×Available Cavity Height =0.61 inches×(0.36 inches+0.030 inches)=0.238 square inches.

The paddle profile can be modelled as a circle with a diameter of 0.335 inches, which yields an area of about 0.088 square inches. Correcting for area mainly at the root (base) of the paddle adds about 0.008 square inches. Therefore, the cross-sectional ratio is:

$$\frac{\text{Paddlewheel Section Area}}{\text{Available Cavity Sectors Area}} = \frac{.088 + .008}{0.238} = 0.40$$

Figure 7:
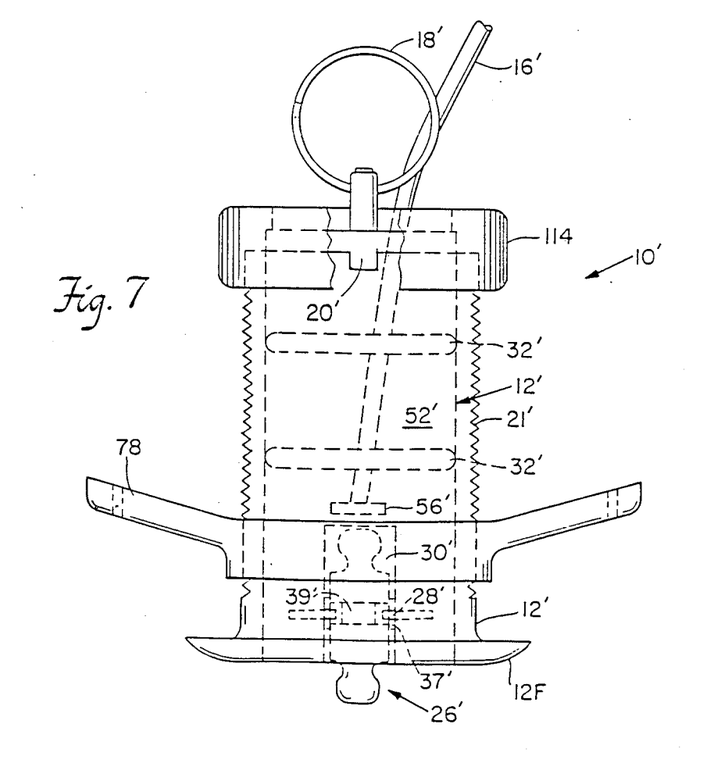
FIG. 7 is an elevational view of an alternate embodiment speed sensor in accordance with the invention with portions broken away.
Figure 8:
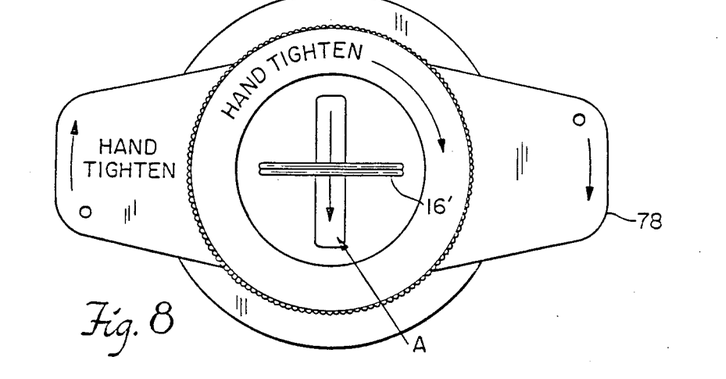
FIG. 8 is a top view of FIG. 7.

FIGS. 7 and 8 show an alternate embodiment of the invention, wherein corresponding parts carry the same numeral with a prime suffix. In this embodiment, a low profile through-hull speed-only-sensor 10' is provided, which mounts on a hull with the lower housing portion 12L' extending through the hull between wing nut 78 and lower flange 12F on housing 12'. Tubular housing 12 may be formed of rigid plastic material with peripheral external threads 21' which engage with internal threads on cap 114 and nut 78. Within the housing, a tubular body 52' is slideably insertable with O-rings 32', forming a fluid-tight seal between housing 12' and body 52. Hall-effect device 56' is encapsulated in body 52' within the roof or arch above cavity 30' closely adjacent paddlewheel 26' rotatably mounted on axle 28' within cavity 30'.

Cable 16' is potted within body 52' and couples wires between the Hall-effect device 56' and a speed meter (not shown). Tab 20' is formed on body 52' and pull ring 18' is disposed in a transverse hole on tab 20' to enable body 52' to be removed from the housing 12'. The arrow A indicates the bow direction in which the paddle would face when secured by cap 114. The cavity 30' and paddlewheel 26' may be appropriately dimensioned, as described in the above referenced tri-sensor embodiment.

The housing projects outside the hull less than ¼ inch, producing a minimum drag profile. Because the boundary layer becomes progressively thicker at slower speeds, this embodiment sacrifices low speed accuracy for minimum housing drag at high speeds.

Figure 9:
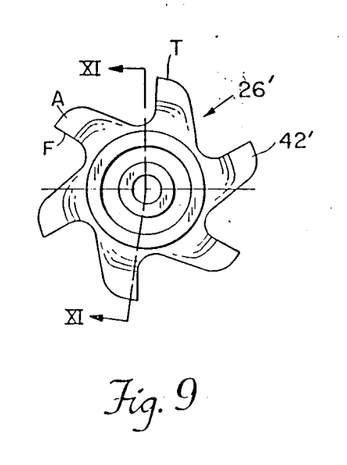
FIG. 9 is a side view of FIG. 10.
Figure 10:
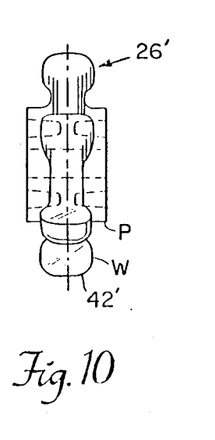
FIG. 10 is an elevational plane view of a six-paddle paddlewheel used in the FIG. 7 embodiment.
Figure 11:
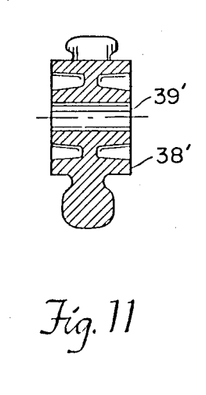
FIG. 11 is a cross-sectional view taken along lines XI—XI of FIG. 9.

FIGS. 9, 10 and 11 show the details of the paddlewheel 26', which has six paddles 42' extending from the hub 38'. Six paddles are preferred in some applications because of the high possible pulse rate produced. Also, a six paddle device has less tendency to stall at low speeds. The fore-to-aft ratio is about 2.8, as in the previous embodiment.

The Cross-Sectional Ratio of this embodiment is identical to the previous embodiment, i.e., 0.40. The Projection Ratio is 0.45. The periphery P of hub 38' is located at, or above, the lower surface of the cavity 30'.

EQUIVALENTS

This completes the detailed description of the preferred embodiments of the invention. It will be apparent, however, to those skilled in the art, that many modifications and changes can be made in the embodiments without departing from the teachings and concept of the invention. It is intended that the following claims cover all equivalent modifications and variations as fall within the scope of the invention.

What is claimed is:

1. A speed sensor for mounting to a marine vessel comprising:
    a. a housing secured to said marine vessel;
    b. a removable body disposed in said housing;
    c. a paddlewheel cavity formed in said body;
    d. a magnetized paddlewheel having a plurality of paddles extending from a central hub and adapted to be rotatably mounted on an axle extending across said cavity transverse the fore and aft direction of travel of the vessel; and wherein the ratio of the cross-section of the paddles in a plane transverse the direction of flow versus the available cross-sectional space within the cavity is in a range between about 0.25 to 0.5;
    e. a magnetic sensor located adjacent said paddlewheel.

2. The speed sensor of claim 1 wherein the sensor means includes coupling means for coupling signals sensed by said sensor means to a speedometer.

3. The speed sensor of claim 2 wherein said sensor means is mounted on a wall of said horizontally extending portion.

4. The speed sensor of claim 3 wherein the paddlewheel is mounted in the intermediate section and the sensor means is mounted in the aft section.

5. The speed sensor of claim 4 including a sonar transducer element mounted in the bow section.

6. The speed sensor of claim 5 including a thermistor mounted in the lower portion with the coupling means, including means for coupling signals from said transducer element and thermistor to depth sounding and temperature indicating instruments, respectively.

7. The speed sensor of claim 1 wherein the ratio is in the order of 0.40.

8. The speed sensor of claim 1 wherein the side walls of the paddles are contoured inwardly to reduce the cross-section.

9. The sensor of claim 1 wherein said cavity extends into the housing from a surface co-planar with the bottom surface of said housing.

10. The sensor of claim 1 wherein said cavity is formed in the lower portion of a tubular body inserted into said housing and retained by seal rings.

11. A speed sensor for mounting to a marine vessel comprising:
    a. a housing secured to said marine vessel;
    b. a removable body disposed in said housing;
    c. a paddlewheel cavity formed in said body;
    d. a magnetized paddlewheel having a plurality of paddles extending from a central hub and adapted to be rotatably mounted on an axle extending across said cavity transverse the fore and aft direction of travel of the vessel; and wherein the ratio of the fore drag coefficient of the paddles to the aft drag coefficient of the paddles is about 2.5 or more and the periphery of said hub does not extend below the lowest portion of said cavity;

e. a magnetic sensor located adjacent said paddlewheel.

12. A speed sensor for mounting to a marine vessel comprising:
    a. a housing secured to said marine vessel;
    b. a removable body disposed in said housing;
    c. a paddlewheel cavity formed in said body;
    d. a magnetized paddlewheel having a plurality of paddles extending from a circular central hub and adapted to be rotatably mounted on an axle extending through an opening in said hub across said cavity transverse the fore and aft direction of travel of the vessel; and wherein the lowest point on the periphery of the hub is located tangentially adjacent to or vertically above the lowest portion of the cavity; the width of the paddle on said paddlewheels between the walls of said cavity being contoured such that the contoured width of said paddles is substantially less than the width of the cavity and the cross-sectional area of the paddles in a plane transverse the direction of flow versus the available cross-sectional area within the cavity is in a range between about 0.25 to 0.5;
    e. a magnetic sensor located adjacent said paddlewheel.

13. A speed sensor for mounting to a marine vessel comprising:
    a. a housing secured to said marine vessel;
    b. a removable body disposed in said housing;
    c. a paddlewheel cavity formed in said body;
    d. a magnetized paddlewheel having a plurality of paddles extending from a central hub and adapted to be rotatably mounted on an axle extending across said cavity transverse the fore and aft direction of travel of the vessel; and wherein the ratio of the paddle length extending from the hub to the overall radius of the paddlewheel is less than about 0.6;
    e. a magnetic sensor located adjacent said paddlewheel.

14. A marine speed sensor comprising:
    a. a housing having an upper vertically extending portion and a lower horizontally extending portion, said horizontally extending portion including an aft, a bow, and an intermediate section;
    b. means for mounting the housing to a marine vehicle;
    c. a paddlewheel having a plurality of magnetized paddles extending from a central hub, said paddlewheel being mounted within a cavity formed within the lower portion of the housing for rotation about an axis transverse an axis extending longitudinally between the bow and aft sections, the periphery of said hub being located adjacent or vertically above the lowest portion of said paddlewheels between the walls of said cavity being contoured such that the contoured width of said paddles is substantially less than the width of the cavity and the cross-sectional area of the paddles in a plane transverse the direction of flow versus the available cross-sectional area within the cavity is in a range between about 0.25 to 0.5; and
    d. sensor means for sensing variations in the magnetic field as the paddles rotate.

15. The speed sensor of claim 14 wherein said sensor means is mounted on a wall of said horizontally extending portion.

16. The speed sensor of claim 15 wherein the paddlewheel is mounted in the intermediate section and the sensor means is mounted in the aft section.

17. The speed sensor of claim 16 including a sonar transducer element mounted in the bow section.

18. The speed sensor of claim 17 including a thermistor mounted in the lower portion with the coupling means, including means for coupling signals from said transducer element and thermistor to depth sounding and temperature indicating instruments, respectively.

* * * * *